(12) United States Patent
Sherman et al.

(10) Patent No.: US 9,279,559 B2
(45) Date of Patent: Mar. 8, 2016

(54) LIGHT DIRECTING FILM (75) Inventors: Audrey A. Sherman, St. Paul, MN (US);
Kevin R. Schaffer, Woodbury, MN
(US); David Scott Thompson, West
Lakeland, MN (US); **William Ward
Merrill**, White Bear Lake, MN (US);
Michael A. Meis, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 284 days.

(21) Appl. No.: 13/807,166

(22) PCT Filed: Jun. 29, 2011

(86) PCT No.: PCT/US2011/042380
§ 371 (c)(1),
(2), (4) Date: Dec. 27, 2012

(87) PCT Pub. No.: WO2012/012180
PCT Pub. Date: Jan. 26, 2012

(65) Prior Publication Data
US 2013/0100647 A1 Apr. 25, 2013

Related U.S. Application Data (60) Provisional application No. 61/360,270, filed on Jun. 30, 2010.

(51) Int. Cl.
*F21V 5/00* (2015.01)
*F21V 5/04* (2006.01)
(Continued)

(52) U.S. Cl.
CPC ............... *F21V 5/04* (2013.01); *G02B 3/0037* (2013.01); *G09F 13/04* (2013.01);
(Continued)

(58) Field of Classification Search
CPC ........... F21V 5/04; F21V 13/04; G02B 3/005; G02B 3/0037; G02B 13/04; G02B 13/0409; G02B 13/08; G02B 13/12; G02B 13/14; G02B 2013/0422; G02B 2013/142; G02B 2013/147
USPC ........ 362/97.4, 243, 245, 327, 330, 331, 332, 362/335, 336
See application file for complete search history.

(56) References Cited

U.S. PATENT DOCUMENTS 5,486,949 A 1/1996 Schrenk
5,882,774 A 3/1999 Jonza
(Continued)

FOREIGN PATENT DOCUMENTS

JP 2000-199804 7/2000
JP 2002-107830 4/2002
(Continued)

OTHER PUBLICATIONS

Graves, "Effect of Healthcare-Acquired Infection on Length of Hospital Stay and Cost", Infection Control and Hospital Epidemiology, Mar. 2007, vol. 28, No. 3 pp. 280-292.
(Continued)

*Primary Examiner* — Y M Lee
(74) *Attorney, Agent, or Firm* — Steven Bern; Colene Blank (57) ABSTRACT A light directing film includes a back major surface having light reflection regions and light transmission regions and being planar, and a front major surface opposing the back surface. The front surface is planar and a plurality of lenses is disposed between the front surface and the back surface. At least selected light transmission regions are registered with selected lens elements. A method for forming the light directing film and illuminated signs utilizing the light directing films are also described.

37 Claims, 3 Drawing Sheets (51) Int. Cl.
*G02B 3/00* (2006.01)
*G09F 13/04* (2006.01)
*G09F 13/14* (2006.01)
*G09F 13/08* (2006.01)

(52) U.S. Cl.
CPC .......... *G09F 13/0409* (2013.01); *G09F 13/08* (2013.01); *G09F 13/14* (2013.01); *G09F 2013/0422* (2013.01); *G09F 2013/142* (2013.01); *G09F 2013/147* (2013.01)

(56) References Cited

U.S. PATENT DOCUMENTS

| | | | |
|---|---|---|---|
| 6,045,894 | A | 4/2000 | Jonza |
| 6,179,949 | B1 | 1/2001 | Buluschek |
| 6,207,260 | B1 | 3/2001 | Wheatley |
| 6,352,761 | B1 | 3/2002 | Hebrink |
| 6,531,230 | B1 | 3/2003 | Weber |
| 6,939,499 | B2 | 9/2005 | Merrill |
| 6,967,779 | B2 * | 11/2005 | Fadel et al. ............... 359/619 |
| 7,248,407 | B2 | 7/2007 | Kwon |
| 7,256,936 | B2 | 8/2007 | Hebrink |
| 7,316,558 | B2 | 1/2008 | Merrill |
| 7,628,502 | B2 * | 12/2009 | Kodama et al. ............ 362/97.1 |
| 2006/0285312 | A1 * | 12/2006 | Ogawa et al. ............... 362/97 |
| 2007/0002452 | A1 | 1/2007 | Munro |
| 2007/0002453 | A1 | 1/2007 | Munro |
| 2007/0127098 | A1 * | 6/2007 | Wood ............................ 359/19 |
| 2008/0148610 | A1 | 6/2008 | Zhu |
| 2010/0045897 | A1 | 2/2010 | Kim |
| 2010/0195020 | A1 | 8/2010 | Goto |
| 2013/0003354 | A1 | 1/2013 | Meis |
| 2013/0033875 | A1 | 2/2013 | Meis |
| 2013/0094084 | A1 | 4/2013 | Merrill |
| 2013/0094085 | A1 | 4/2013 | Merrill |
| 2013/0094088 | A1 | 4/2013 | Merrill |
| 2013/0095434 | A1 | 4/2013 | Dunn |
| 2013/0095435 | A1 | 4/2013 | Dunn |

FOREIGN PATENT DOCUMENTS

| | | |
|---|---|---|
| JP | 2006-318886 | 11/2006 |
| KR | 10-2005-0005310 | 1/2005 |
| KR | 10-2005-0072551 | 7/2005 |
| KR | 2009-0083688 | 8/2009 |
| WO | WO 2008-144136 | 11/2008 |
| WO | WO 2008-144656 | 11/2008 |
| WO | WO 2009-022725 | 2/2009 |
| WO | WO 2010-075340 | 7/2010 |
| WO | WO 2010-075357 | 7/2010 |
| WO | WO 2010-075363 | 7/2010 |
| WO | WO 2010-075373 | 7/2010 |
| WO | WO 2010-075383 | 7/2010 |
| WO | WO 2010-120864 | 10/2010 |
| WO | WO 2011-062954 | 5/2011 |
| WO | WO 2011-088161 | 7/2011 |
| WO | WO 2011-090625 | 7/2011 |
| WO | WO 2012-003213 | 1/2012 |
| WO | WO 2012-003215 | 1/2012 |
| WO | WO 2012-003247 | 1/2012 |
| WO | WO 2012-012118 | 1/2012 |
| WO | WO 2012-012177 | 1/2012 |
| WO | WO 2012-078469 | 6/2012 |

OTHER PUBLICATIONS

International Search Report Form PCT/ISA/210; International Application No. PCT/US2011/042380, International Filing Date: Jun. 29, 2011, 3 pages.

U.S. Appl. No. 61/360,127, filed Jun. 30, 2010, "Retarder Film Combinations With Spatially Selective Birefringence Reduction".

U.S. Appl. No. 61/360,129, filed Jun. 30, 2010, "Mask Processing Using Films With Spatially Selective Birefringence Reduction".

U.S. Appl. No. 61/360,022, filed Jun. 30, 2010, "Multi-Layer Articles Capable of Forming Color Images and Methods of Forming Color Images".

U.S. Appl. No. 61/360,032, filed Jun. 30, 2010, "Multi-Layer Articles Capable of Forming Color Images and Methods of Forming Color Images".

U.S. Appl. No. 61/360,124, filed Jun. 30, 2010, "Diffuse Reflective Optical Films With Spatially Selective Birefringence Reduction".

* cited by examiner

LIGHT DIRECTING FILM

BACKGROUND

There are a number of major types of illuminated sign technologies presently in use. A first type is surface-painted signs which are illuminated by external light sources, such as floodlights, which are generally located at acute angles to the sign. Light energy is wasted since, a) the entire sign surface is illuminated (not just the message), and b) a great percentage of the light reflected never reaches the observer either being spilled off to the sky or ground.

A second type of illuminated sign is a lighted box sign where a light source is placed behind a translucent surface (that can provide structural support for the sign) with the message spelled out on the translucent surface, in characters contrasting to the translucent surface background. Light energy is produced to provide equal luminous emission over the face of the sign, including the background, as opposed to lighting only the character which has to be seen. Only a small fraction of the light produced reaches the eye of the observer, as the light exits the sign in all directions including upwards, thus wasting energy and causing a considerable amount of light pollution.

A third type of illuminated sign includes signs including light sources which themselves spell out the sign message. Neon signs, exposed incandescent filament lamp signs and channel letters are examples of this technology. When not lit, these signs are not readily visible (unless paint is applied under the character or symbol) and are thus totally dependent on being illuminated to deliver the message. These signs are costly to make, operate and maintain as they are custom made for the client, of limited life span, fragile and the incandescent version is energy wasteful.

A fourth type of illuminated sign includes an LED matrix sign. LED technology is taken advantage of to create changing-message signs. These dynamic message signs are computer-controlled and provide interesting and attention-grabbing signs which are a solution to illuminated signs with the need for a changing message.

However, most illuminated signs are of a fixed message, and these signs are initially expensive and costly to operate and maintain.

BRIEF SUMMARY

The present disclosure relates to light directing film. In particular, the present disclosure relates to light directing film that can be utilized in signage that can collimate light to preferentially direct light toward a viewer. The light directing film includes lenses with self-registered apertures or light transmission regions.

In one illustrative embodiment, a light directing film includes a back major surface having light reflection regions and light transmission regions and being planar, and a front major surface opposing the back surface. The front surface is planar and a plurality of lenses is disposed between the front surface and the back surface. At least selected light transmission regions are registered with selected lens elements.

In another illustrative embodiment, a method includes directing radiation toward a front surface of a light directing film to form light transmissive regions in a light reflecting layer of a light directing film. The light directing film includes a back major surface having a light reflection layer and a front major surface opposing the back surface. The front surface is planar and a plurality of lenses is disposed between the front surface and the back surface. At least selected light transmission regions are registered with selected lens elements.

In a further illustrative embodiment, an illuminated sign includes an enclosure having a light reflection surface and a light emission surface and a light source is disposed within the enclosure. A light directing film forms at least a portion of the light emission surface. The light directing film includes a back major surface having light reflection regions and light transmission regions and being planar, and a front major surface opposing the back surface. The front surface is planar and a plurality of lenses is disposed between the front surface and the back surface. At least selected light transmission regions are registered with selected lens elements.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", and "on top", if used herein, are utilized for ease of description to describe spatial relationships of an element(s) to another. Such spatially related terms encompass different orientations of the device in use or operation in addition to the particular orientations depicted in the figures and described herein. For example, if a cell depicted in the figures is turned over or flipped over, portions previously described as below or beneath other elements would then be above those other elements.

As used herein, when an element, component or layer for example is described as being "on" "connected to", "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as begin "directly on", "directly connected to", "directly coupled with", or "directly in contact with" another element, there are no intervening elements, components or layers for example.

The present disclosure relates to light directing film. In particular, the present disclosure relates to light directing film that can be utilized in signage, for example, that can collimate light to preferentially direct light toward a viewer. The light directing film includes light transmission windows that are registered with lenses and light reflection areas between the light transmission windows. The light transmission windows are self-registered with the lenses since they are formed via radiation transmission through the lenses. The angular distribution of the light exiting the light directing film is determined by the geometry of the lens and the size and position of the self-aligned light transmission windows with respect to the focal point of the lens. In many embodiments, the self-aligned light transmission windows are formed via radiation heating up a radiation focal area in a multi-layer reflective film that reflects light due to a birefringence difference of alternating layers of the multi-layer film where the heating alters the birefringence difference and changes the light reflecting property of the radiation focal area and forming the light transmission window that is self aligned with the lens transmitting the radiation. While the present disclosure is not so limited, an appreciation of various aspects of the disclosure will be gained through a discussion of the examples provided below.

Figure 1:
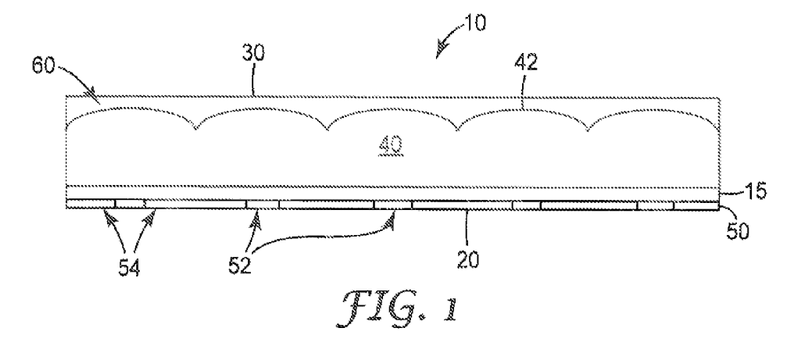
FIG. 1 is a cross-sectional schematic diagram of an illustrative light directing film.
Figure 2:
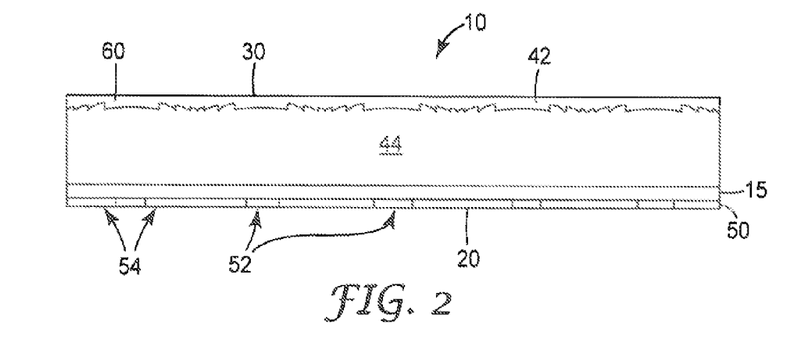
FIG. 2 is a cross-sectional schematic diagram of another illustrative light directing film.
Figure 3:
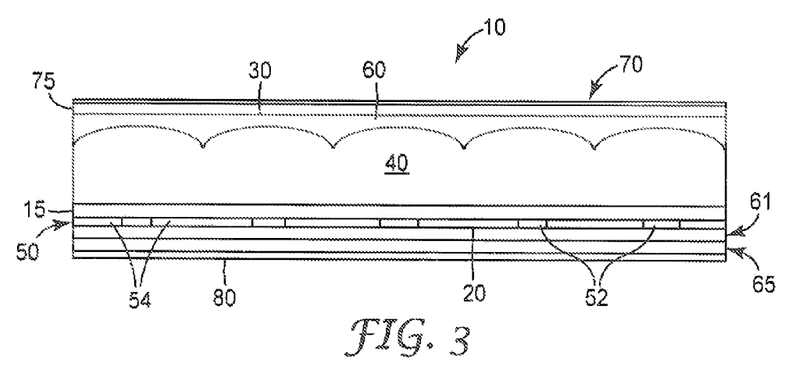
FIG. 3 is a cross-sectional schematic diagram of another illustrative light directing film.

FIGS. 1-3 are cross-sectional schematic diagram of illustrative light directing films 10. The light directing film 10 includes a back major surface 20 having light reflection regions 54 and light transmission regions 52 and being planar. A front major surface 30 opposes the back surface 20. The front surface 30 being planar. A plurality of lenses 40, 44 are disposed between the front surface 30 and the back surface 20. At least selected light transmission regions 52 are registered with selected lens elements 42. The light directing films 10 can have any useful thickness. In many embodiments, the light directing films 10 has a thickness of less than 2 millimeters or less than 1 millimeter.

In many embodiments, the light directing films 10 further includes a graphic image 70 adjacent to the front surface 30. The graphic image 70 can be printed directly on the front surface 30 or the graphic image 70 can be fixed to the front surface 30 with an adhesive layer 75. In some embodiments, the graphic image 70 is just a solid colored layer.

A layer of transparent material 60 having an effective refractive index of less than 1.3 separates the plurality of lenses 40, 44 from the front surface 30. The layer of transparent material 60 can be referred to as a nanovoided layer, described below. In the some embodiments, the front major surface 30 (or layer of transparent material 60) has an effective refractive index of less than 1.2.

In many embodiments, the plurality of lenses 40, 44 is a linear lens array. In some embodiments, the plurality of lenses is a linear lenticular lens array 40. In some embodiments, the plurality of lenses is a Fresnel lens array 44. The linear lens array 40, 44 has any useful period. In many embodiments, the linear lens array 40, 44 has a period of less than 500 micrometers or less than 250 micrometers or less than 100 micrometers. In many embodiments, the linear lens array 40, 44 in the light directing film 10 can be is coextensive across a length of the light directing film 10.

The light reflection regions 54 can reflect at least 90% of incident light or at least 95% of incident light or at least 99% of incident light. The light reflection regions 54 can be formed of any useful light reflection (diffuse or specular) material. In many embodiments, the light reflection regions 54 are formed of a reflective or mirror film. One commercially available reflective film is available under the trade designation Vikuiti Enhanced Specular Reflector Film from 3M Company, St. Paul, Minn.

Figure 4A:
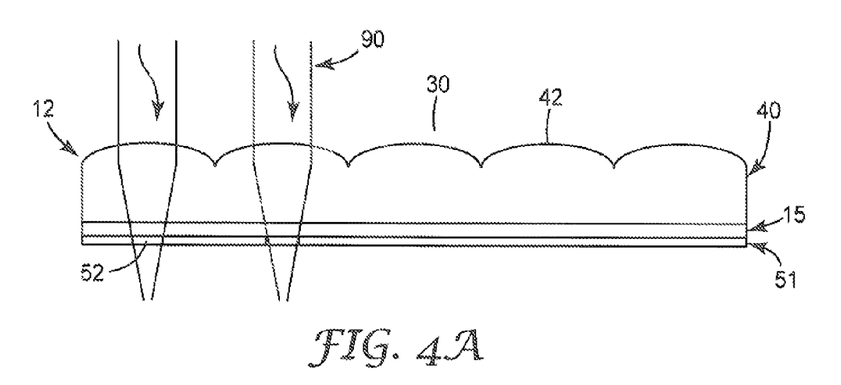
FIGS. 4A and 4B are illustrative diagrams of a method of forming a light directing film.
Figure 4B:
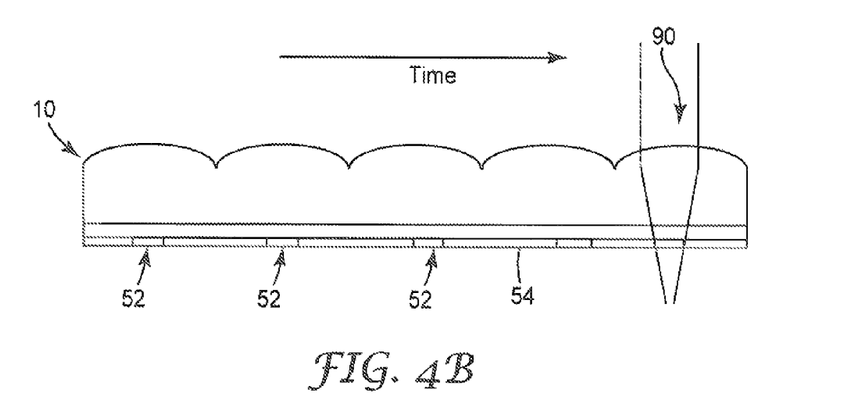

The light reflection regions 54 separate the light transmission regions 52 and are within a common plane. The light reflection regions 54 and the light transmission regions 52 can be formed of the same layer of material 50 where the optical properties of the layer of material 50 has been modified to render portions of the layer of material 50 transparent or reflective. An example of this is illustrated in FIG. 4A and FIG. 4B. In many embodiments, the layer of material 50 is a multilayer optical film such as a commercially available reflective film (e.g., trade designation Vikuiti Enhanced Specular Reflector Film) that is formed of multiple layers of alternating birefringence and modified with thermal receptors that alter the birefringence of the alternating layers and change the light reflection properties preferentially in the heated regions of the reflective film and form self-aligned light transmission regions 52.

The light directing films 10 can further include additional layers. For example, light directing films 10 can include an adhesive layer 75, 65 disposed on the front surface 30 or the back surface 20. The adhesive layer 75, 65 can be structured to provide air bleed channels or aid in the repositionability of the adhesive layer 75, 65. An additional layer of transparent material 61 having an effective refractive index of less than 1.3 can be disposed on the back surface 20 as illustrated in FIG. 3. A graphic, or hardcoat layer or a dirt shedding layer 70 can be disposed on or adjacent to the front surface 30 or back surface 20.

FIGS. 4A and 4B are illustrative diagrams of a method of forming a light directing film 10. The illustrative method includes directing radiation 90 toward a front surface 30 of a light directing film 12 to form light transmissive regions 52 in a light reflecting layer 51 of a light directing film 12. The radiation 90 passes through the lens 42 feature and forms a registered light transmissive region 52, that is, a light transmissive region 52 self-registered with the lens 42 feature. The radiation 90 can form the light transmissive regions 52 sequentially or simultaneously. In some embodiments, the radiation 90 forms the light transmissive regions 52 simultaneously.

In many embodiments, the radiation 90 heats up selected regions 52 of the light reflecting layer 51 to increase the light transmissivness (or reduces the light reflectivity) of the selected regions 52. In many embodiments, the radiation 90 heats up selected regions 52 of the light reflecting layer 51 to alter a birefringence difference of alternating layers that form the light reflecting layer 51 which alters (e.g., increases) the light transmission property of the selected regions 52.

The teachings of this application can be used in combination with the teachings of the following commonly assigned applications, which are incorporated herein by reference: International Application No. PCT/US2009/069153, "Internally Patterned Multilayer Optical Films Using Spatially Selective Birefringence Reduction", filed Dec. 22, 2009, and the following application being filed on even date herewith 3M Company application Ser. No. 61/139,736.

An illustrative method to form the light transmissive regions 52 in a light reflecting layer 51 is described in the applications referenced above. In this described method, an optically reflective film with a first reflective characteristic, e.g., a broad-band visible reflective mirror that is modified in selected location or regions to a second reflective characteristic, e.g., clear or light tranmissive window, and can be referred to as a "spatially tailored optical film". In this method, the radiation 90 heats up thermal receptors, such as absorbing dyes, pigments, or nanoparticles in the selected regions 52 of the light reflecting layer 51 to alter a birefringence difference of alternating layers that form the light reflecting layer 51 and increase the light transmissivness of the selected regions 52. This method does not remove material from the selected regions 52. In many embodiments, the radiation 90 is collimated and directed toward the front surface 30 of a light directing film 12, 10.

Angular distribution of the light transmitted from the light directing film 10 can be tailored and controlled by specifically directing the radiation 90 at the front surface 30 of the film 10, 12 in a particular angular distribution. Radiation 90 will pass through the lens and form the self-registered light transmissive regions 52 in a light reflecting layer 51 and provide a light emission angular distribution that substantially matches the angular distribution of the radiation 90 that formed the light transmissive regions 52. The illustrated radiation 90 is directed normal at the front surface 30 of the film 10, 12 thus the angular distribution of light emitted from the light directing film 10 of FIGS. 4A and 4B will be substantially the same as that of the radiation 90 is directed normal at the front surface 30 of the film 10, 12. Similarly, if the desired mission light angular distribution is collimated at a particular angle, this light directing film 10 is formed by directing radiation 90 at the front surface 30 of the film 10, 12 at the particular angle.

The light reflecting layer 51 can be formed of a multilayer optical film where the radiation changes (e.g., reduces) the birefringence of the layers of the film to render the multilayer optical film light transmissive in the selected regions 52. Exemplary multilayer optical films are generally disclosed in: U.S. Pat. No. 5,486,949 (Schrenk et al.) "Birefringent Interference Polarizer"; U.S. Pat. No. 5,882,774 (Jonza et al.) "Optical Film"; U.S. Pat. No. 6,045,894 (Jonza et al.) "Clear to Colored Security Film"; U.S. Pat. No. 6,179,949 (Merrill et al.) "Optical Film and Process for Manufacture Thereof"; U.S. Pat. No. 6,531,230 (Weber et al.) "Color Shifting Film"; U.S. Pat. No. 6,939,499 (Merrill et al.) "Processes and Apparatus for Making Transversely Drawn Films with Substantially Uniaxial Character"; U.S. Pat. No. 7,256,936 (Hebrink et al.) "Optical Polarizing Films with Designed Color Shifts"; U.S. Pat. No. 7,316,558 (Merrill et al.) "Devices for Stretching Polymer Films"; PCT Publication WO 2008/144136 A1 (Nevitt et al.) "Lamp-Hiding Assembly for a Direct Lit Backlight"; PCT Publication WO 2008/144656 A2 (Weber et al.) "Backlight and Display System Using Same".

In particular, potentially suitable spatially tailored optical films are disclosed in: International Application No. PCT/US2009/069153, "Internally Patterned Multilayer Optical Films Using Spatially Selective Birefringence Reduction", filed Dec. 22, 2009; International Application No. PCT/US2009/069120, "Multilayer Optical Films Having Side-by-Side Mirror/Polarizer Zones", filed Dec. 22, 2009; International Application No. PCT/US2009/069173, "Multilayer Optical Films Suitable for Bi-Level Internal Patterning", filed Dec. 22, 2009; International Application No. PCT/US2009/069160, "Internally Patterned Multilayer Optical Films With Multiple Birefringent Layers", filed Dec. 22, 2009; and International Application No. PCT/US2009/069192, "Multilayer Optical Films Having Side-by-Side Polarizer/Polarizer Zones", filed Dec. 22, 2009; and the following applications being filed on even date herewith: U.S. Application 61/360,127, "Retarder Film Combinations With Spatially Selective Birefringence Reduction"; U.S. Application 61/360,129, "Mask Processing Using Films With Spatially Selective Birefringence Reduction"; U.S. Application 61/360,022, "Multi-Layer Articles Capable of Forming Color Images and Methods of Forming Color Images"; U.S. Application 61/360,032, "Multi-Layer Articles Capable of Forming Color Images and Methods of Forming Color Images"; and "Diffuse Reflective Optical Films With Spatially Selective Birefringence Reduction"; U.S. Application 61/360,124.

A variety of thermal receptors or absorbing agents can be used to heat up the light reflecting layer 51 selected regions 52. For optical films operating in the visible spectrum, dyes, pigments, or other additives that absorb in the ultraviolet and infrared (including near infrared) regions may be used. In some cases it may be advantageous to select an agent that absorbs in a spectral range for which the polymer materials of the film have a substantially lower absorption. By incorporating such an absorbing agent into selected layers of a multilayer optical film, directed radiation can preferentially deliver heat to the selected layers rather than throughout the entire thickness of the film. Exemplary absorbing agents may be melt extrudable so that they can be embedded into a selected layer set of interest. To this end, the absorbers are preferably reasonably stable at the processing temperatures and residence times required for extrusion. For further information on potentially suitable absorbing agents, reference is made to U.S. Pat. No. 6,207,260 (Wheatley et al.) "Multicomponent Optical Body".

The layer of transparent material 60 having an effective refractive index of 1.3 or lower can also be referred to, in many embodiments, as a nanovoided layer. A nanovoided layer can include a plurality of interconnected voids or a network of voids dispersed in a binder. At least some of the voids in the plurality or network are connected to one another via hollow tunnels or hollow tunnel-like passages. The voids are not necessarily free of all matter and/or particulates. For example, in some embodiments, a void may include one or more small fiber- or string-like objects that include, for example, a binder and/or nanoparticles. Some disclosed nanovoided layers include multiple pluralities of interconnected voids or multiple networks of voids where the voids in each plurality or network are interconnected. In some cases, in addition to multiple pluralities of interconnected voids, the disclosed nanovoided layer include a plurality of closed or unconnected voids meaning that the voids are not connected to other voids via tunnels.

In some embodiments, nanoparticles are incorporated into the nanovoided layer. The nanoparticles can have an average particle size that is not greater than about 1 micrometers, or not greater than about 700 nm, or not greater than about 500 nm, or not greater than about 200 nm, or not greater than about 100 nm, or not greater than about 50 nm.

In some embodiments, some of the nanoparticles can be sufficiently small so that they primarily affect the effective index, while some other nanoparticles can affect the effective index and scatter light, while still some other particles can be sufficiently large so that their primary optical effect is to scatter light. In one embodiment, the nanoparticles can be inorganic nanoparticles, organic (e.g., polymeric) nanoparticles, or a combination of organic and inorganic nanoparticles. In one particular embodiment, nanoparticles can be porous particles, hollow particles, solid particles, or a combination thereof. Examples of suitable inorganic nanoparticles include silica and metal oxide nanoparticles including zirconia, titania, ceria, alumina, iron oxide, vanadia, antimony oxide, tin oxide, alumina/silica, and combinations thereof. The nanoparticles can have an average particle diameter less than about 1000 nm, less than about 100 nm, less than about 50 nm, or from about 3 nm to about 50 nm. In some embodiments, the nanoparticles can have an average particle diameter from about 3 nm to about 50 nm, or from about 3 nm to about 35 nm, or from about 5 to about 25 nm. If the nanoparticles are aggregated, the maximum cross sectional dimension of the aggregated particle can be within any of these ranges, and can also be greater than about 100 nm. In some embodiments, "fumed" nanoparticles, such as silica and alumina, with primary size less than about 50 nm, are also included, such as CAB-O-SPERSE® PG 002 fumed silica, CAB-O-SPERSE® 2017A fumed silica, and CAB-O-SPERSE® PG 003 fumed alumina, available from Cabot Co. Boston, Mass.

In some embodiments, nanovoided layer has a low optical haze value. In such cases, the optical haze of the nanovoided layer is not greater than about 5%, or not greater than about 4%, or not greater than about 3.5%, or not greater than about 3%, or not greater than about 2.5%, or not greater than about 2%, or not greater than about 1.5%, or not greater than about 1%. For light normally incident on nanovoided layer, optical haze, as used herein, is defined as the ratio of the transmitted light that deviates from the normal direction by more than 4 degrees to the total transmitted light. Index of refraction values were measured using a Metricon Model 2010 Prism Coupler (available from Metricon Corp., Pennington, N.J.). Optical transmittance, clarity and haze were measured using a Haze-Gard Plus haze meter (available from BYK-Gardiner, Silver Springs, Md.).

In general, the nanovoided layer can have any porosity or void volume fraction that may be desirable in an application. In some cases, the volume fraction of plurality of voids in nanovoided layer is not less than about 10%, or not less than about 20%, or not less than about 30%, or not less than about 40%, or not less than about 50%, or not less than about 60%, or not less than about 70%, or not less than about 80%, or not less than about 90%.

Binder can be or include any material that may be desirable in an application. For example, binder can be a light curable material that forms a polymer, such as a cross-linked polymer. In general, binder can be any polymerizable material, such as a polymerizable material that is radiation-curable. In some embodiments binder can be any polymerizable material, such as a polymerizable material that is thermally-curable.

Polymerizable material can be any polymerizable material that can be polymerized by various conventional anionic, cationic, free radical or other polymerization technique, which can be chemically, thermally, or initiated with actinic radiation, e.g., processes using actinic radiation including, e.g., visible and ultraviolet light, electron beam radiation and combinations thereof, among other means. The media that polymerizations can be carried out in include, including, e.g., solvent polymerization, emulsion polymerization, suspension polymerization, bulk polymerization, and the like.

In general, nanovoided layer can have a desirable porosity for any weight ratio of binder to plurality of nanoparticles. Accordingly, in general, the weight ratio can be any value that may be desirable in an application. In some cases, the weight ratio of binder to a plurality of nanoparticles is not less than about 1:2.5, or not less than about 1:2.3, or not less than about 1:2, or not less than about 1:1, or not less than about 1.5:1, or not less than about 2:1, or not less than about 2.5:1, or not less than about 3:1, or not less than about 3.5:1, or not less than about 4:1, or not less than about 5:1. In some cases, the weight ratio is in a range from about 1:2.3 to about 4:1.

Illustrative nanovoided layers are described with the teachings of the following commonly assigned applications, which are incorporated herein by reference: Application Ser. No. 61/169,466 "Optical Film", filed 15 Apr. 2009, Application Ser. No. 61/294,610 "Microstructured Low Refractive Index Viscoelastic Articles", filed 13 Jan. 2010, and Application Ser. No. 61/294,600 "Microstructured Low Refractive Index Articles", filed 13 Jan. 2010.

Figure 5:
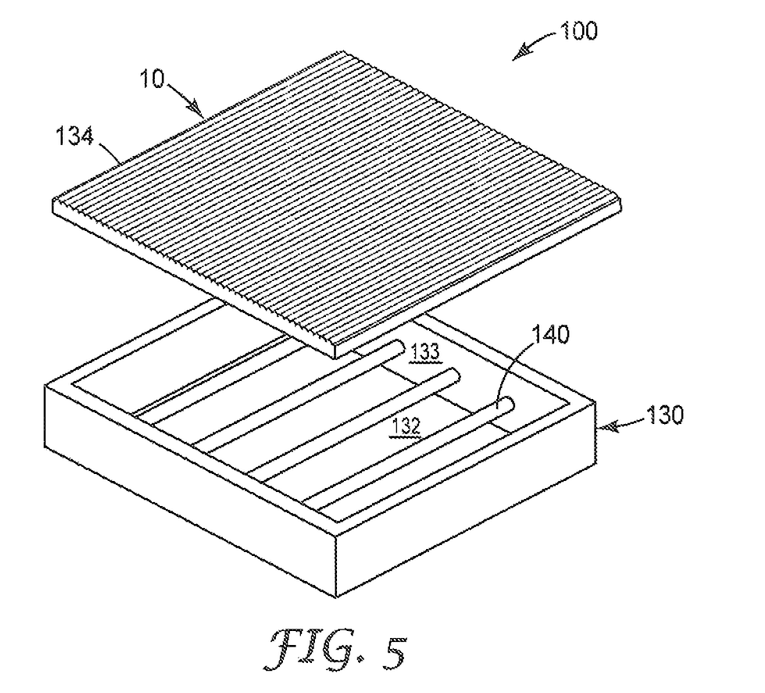
FIG. 5 is an exploded perspective schematic diagram of an illustrative illuminated sign.

FIG. 5 is an exploded perspective schematic diagram of an illustrative illuminated sign 100 utilizing the light directing film 10 described herein. The illuminated sign 100 includes an enclosure 130 and a light source 140 disposed within the enclosure 130. The enclosure 130 includes a light reflection surface 132, 133 and a light emission surface 134. In many embodiments, the enclosure 130 forms a light box having side surfaces 133 and a back surface 132. In some embodiments the back surface is fully reflective. In some embodiments the back surface 132 includes a second light emission surface that can include a second light directing film 10, forming a double-sided illuminated sign.

The light reflection surface 132, 133 can be formed of any useful light reflection material and can be highly efficient to maximize light efficiency. In many embodiments the light reflection surface 132, 133 are at least 90% efficient or at least 95% efficient. In some embodiments, the light reflection surface 132, 133 can be a reflective or mirror film. One commercially available reflective film is available under the trade designation Light Enhancement Film from 3M Company, St. Paul, Minn. The light reflection surface 132, 133 can be diffusely reflective or specularly reflective. Diffusely reflective surfaces can include white paint or a material that includes $TiO_2$ particles.

The light source 140 can be any useful light source 140. In some embodiments the light source 140 is fluorescent tubes. In some embodiments the light source 140 is solid state devices such as light emitting diodes, for example.

A light directing substrate can form at least a portion of the light emission surface 134 and the light directing film 10 can be fixed or adhered to the light directing substrate. The light directing substrate can be self-supporting and form a structural element (front or back surface of the illuminated sign 100, for example). In many embodiments the light directing substrate can have a thickness of 2500 micrometers or greater. As illustrated, the linear lens array in the light directing film 10 can be is coextensive across a length of the light directing film.

When the light directing film 10 is utilized in an illuminated sign 100, light that strikes the interior surface of the light directing film between the light transmission windows is substantially reflected and recycled within the illuminated sign enclosure until it strikes a surface of a light transmission window and is transmitted through the light collimating substrate. In this manner the light emitted by the illuminated sign conforms to a controlled angular distribution of brightness.

These illuminated signs that utilize the light directing film exhibit diminished brightness where illumination is not desired (e.g., reduced "light pollution"), increased brightness where illumination is desired (e.g., to a viewer of the sign), and/or enhanced spatial uniformity of emission.

Specific embodiments of the light directing film include:

A first embodiment having a light directing film comprising: a back major surface comprising light reflection regions and light transmission regions and being planar; a front major surface opposing the back surface, the front surface being planar; and a plurality of lenses disposed between the front surface and the back surface, wherein at least selected light transmission regions are registered with selected lens elements.

Additionally, a light directing film according to the first embodiment, further comprising a graphic image adjacent to the front surface.

Additionally, a light directing film according to any embodiment above, wherein the front major surface has an effective refractive index of less than 1.3.

Additionally, a light directing film according to any embodiment above, wherein the front major surface has an effective refractive index of less than 1.2.

Additionally, a light directing film according to any embodiment above, wherein the plurality of lenses comprises a linear lens array.

Additionally, a light directing film according to any embodiment above, wherein the plurality of lenses comprises a linear lenticular lens array or Fresnel lens array.

Additionally, a light directing film according to any embodiment above, wherein a layer of transparent material having an effective refractive index of less than 1.3 separates the plurality of lenses from the front surface.

Additionally, a light directing film according to any embodiment above, wherein the light reflection regions reflect at least 90% of incident light.

Additionally, a light directing film according to any embodiment above, wherein the light reflection regions separate the light transmission regions and are within a common plane.

Additionally, a light directing film according to any embodiment above, wherein the linear lens array has a period of less than 500 micrometers.

Additionally, a light directing film according to any embodiment above, wherein the light directing film has a thickness of less than 2 mm.

Additionally, a light directing film according to any embodiment above, further comprising an adhesive layer disposed on the front surface or the back surface.

Additionally, a light directing film according to any embodiment above, further comprising a hardcoat layer or a dirt shedding layer disposed on or adjacent to the front surface.

Additionally, a light directing film according to any embodiment above, wherein the light reflection regions comprise nanoparticle thermal receptors.

A method embodiment comprising: directing radiation toward a front surface of a light directing film to form light transmissive regions in a light reflecting layer of a light directing film, the light directing film comprising: a back major surface comprising a light reflection layer; a front major surface opposing the back surface, the front surface being planar; and a plurality of lenses disposed between the front surface and the back surface, wherein at least selected light transmission regions are registered with selected lens elements.

Additionally, a method according to the method above, wherein the radiation heats up selected regions of the light reflecting layer to increase the light transmissivness of the selected regions.

Additionally, a method according to any method above, wherein the radiation heats up nanoparticle thermal receptors in the selected regions of the light reflecting layer to increase the light transmissivness of the selected regions.

Additionally, a method according to any method above, wherein the radiation does not remove material from the selected regions.

Additionally, a method according to any method above, wherein the radiation is collimated.

Additionally, a method according to any method above, further comprising disposing a graphic image adjacent to the front surface.

Additionally, a method according to any method above, further comprising disposing an adhesive layer adjacent to the front surface or back surface.

Additionally, a method according to any method above, further comprising disposing a hardcoat layer or a dirt shedding layer adjacent to the front surface.

Additionally, a method according to any method above, wherein the front major surface has an effective refractive index of less than 1.3.

Additionally, a method according to any method above, wherein the plurality of lenses comprises a linear lenticular lens array or Fresnel lens array.

Additionally, a method according to any method above, wherein a layer of transparent material having an effective refractive index of less than 1.3 separates the plurality of lenses from the front surface.

A sign embodiment having an illuminated sign comprising: an enclosure comprising a light reflection surface and a light emission surface; a light source disposed within the enclosure; a light directing film forming at least a portion of the light emission surface, the light directing film comprising: a back major surface comprising light reflection regions and light transmission regions and being planar; a front major surface opposing the back surface, the front surface being planar; and a plurality of lenses disposed between the front surface and the back surface, wherein at least selected light transmission regions are registered with selected lens elements.

Additionally, an illuminated sign according to the sign embodiment above, further comprising a graphic image adjacent to the front surface Additionally, an illuminated sign according to any sign embodiment above, wherein the front major surface has an effective refractive index of less than 1.3.

Additionally, an illuminated sign according to any sign embodiment above, wherein the plurality of lenses comprises a linear lens array that is coextensive across a length of the light directing film.

Additionally, an illuminated sign according to any sign embodiment above, wherein the linear lens array has a period of less than 500 micrometers.

Additionally, an illuminated sign according to any sign embodiment above, wherein the plurality of lenses comprises a linear lenticular lens array or Fresnel lens array.

Additionally, an illuminated sign according to any sign embodiment above, wherein a layer of transparent material having an effective refractive index of less than 1.3 separates the plurality of lenses from the front surface.

Additionally, an illuminated sign according to any sign embodiment above, wherein the light reflection regions separate the light transmission regions and are within a common plane.

Additionally, an illuminated sign according to any sign embodiment above, wherein the light directing film has a thickness of less than 2 mm.

Additionally, an illuminated sign according to any sign embodiment above, further comprising an adhesive layer disposed on the front surface or the back surface.

Additionally, an illuminated sign according to any sign embodiment above, further comprising a hardcoat layer or a dirt shedding layer disposed on or adjacent to the front surface.

Additionally, an illuminated sign according to any sign embodiment above, wherein the light reflection regions comprise nanoparticle thermal receptors.

Examples

These examples are merely for illustrative purposes only and are not meant to be limiting on the scope of the appended claims. All parts, percentages, ratios, etc. in the examples and the rest of the specification are by weight, unless noted otherwise.

A spatially tailorable optical film (STOF) was made in accord with the general description and examples provided in Merrill, et al, PCT International Publication Number WO 2010/075357 A1. In particular, a red reflecting film was formed by co-extrusion of approximately 300 alternating layers of two polymeric materials, one containing an infra-red absorbing dye of chosen concentration, casting the extrudate into a quenched web or film and furthermore stretching this cast web biaxially to form an optically reflecting film.

More specifically, a 90/10 mol % first copolymer of PEN and PET sub-unit, i.e. comprising 90 mol % naphthalene dicarboxylate, 10 mol % terephthalate as carboxylates, e.g. as described in U.S. Pat. No. 6,352,761 (Hebrink et al.), was used as the so-called high index optics layers. A 55/45 HD coPEN second copolymer, e.g. as described in Example 10 of U.S. Pat. No. 6,352,761 (Hebrink et al.), was used as the so-called low index optics layers. A masterbatch comprising one wt % Epolite™ 4121 infra-red absorbing dye, available from Epolin, Newark N.J., was formed by extrusion compounding the dye powder into the 55/45 HD coPEN polymer. The masterbatch was further more introduced into the 55/45 HD coPEN resin feed stream for the co-extrusion process in the proportion of 1:17 to the pure copolymer. The coPEN was combined into approximately 150 layers alternating with another approximately 150 layers of the 90/10 coPEN first copolymer the layers, the layers comprising material in the weight proportion of about 9:10. The outer layers of the coextruded films were protective boundary layers (PBLs) comprising the first copolymer. These layers formed the so-called optical packet. A final co-extruded pair of skin layers, also comprising this first copolymer, was also co-extruded in a total proportion of about 1:4 to the optical packet. The extruded web was quenched and then furthermore heated and stretched over rollers, in a length orienter, to a draw ratio of about 3.7, and then furthermore heated and stretched transversely to a draw ratio of about 4, in a tenter. The film was furthermore heatset after stretching to approximately 215 degrees C. The resulting optical film was approximately 35 microns thick with a reflection band spanning from about 580 nm to about 680 nm. The transmission through a central portion of the band was about 2%.

An 18 mil Dura-GO Lenstar lenticular film with 75 lines per inch, available from Tekra, New Berlin Wis., was applied to the red-reflecting optical film using an 8141 optically clear adhesive, available from 3M Company, St. Paul, Minn. The lenticular film was used as a mask to direct the radiant processing to make the final patterned film. The radiant energy in this example was chosen to be from a laser source; although in principle, any radiant energy source of appropriate power flux, e.g. from a concentrated bulb or lamp source, could be used. In one case, an 808 nm laser diode with an average power of about 831 mW was scanned across the lenticular side of the optical construction in a scanning pattern perpendicular to the cylindrical propagators of the lenticular. When the power was set too low, or the scan speed set too high, no significant processing was observed, demonstrating a threshold condition for processing. The line scans were then undertaken across the 119 mm×119 mm processed area uni-directionally, at a speed of about 60 mm/sec and a line separation of about 30 microns. In a second case, a smaller region 25 mm×25 mm was processed, using an average power of about 362 mW and a scan speed of about 15 mm/sec. In these cases, the films were successfully processed.

The processed films were viewed under an optical microscope. Viewing from the lenticular side under transmission, the unprocessed areas provided an approximately cyan color, characteristic of a red reflector, while the processed areas provided a more white color. Viewing from the lenticular side under reflection, the unprocessed areas provided a red color, while the processed areas were many dark, as would be expected for a film with reflectivity greatly reduced or eliminated. Viewing from the red-reflecting film side of the construction, again under reflection, alternating stripes of red-reflecting and dark (non-reflecting or reduced reflecting) regions were observed. The striped areas of reduced or eliminated reflectivity corresponded to the more light-focused areas under the lenticular. The striped regions between these focal areas, e.g. at and near the seams between lenticulars, maintained their reflectivity. Thus, the masking effect of the lenticular, coupled to a threshold condition needed for reflectivity reduction under radiant processing, divided the film into processed and unprocessed striped regions in the construction. Moreover, the construction demonstrated a self-registered processing pattern wherein the processed regions corresponded to the light-focusing regions of the surface patterned mask.

In a simple extension of this example, the lenticular could be conceivably removed from the construction to form a patterned film without the lenticular mask. In such extensions, the lenticular could be temporarily placed over the film, e.g. by a tensioning system with rollers. Alternatively, a removable adhesive could be used. Other focusing surface masks, with 1D or 2D pattern propagation could be likewise considered. The masking surface patterns could also vary in a non-regular manner.

A recycling backlight cavity box was constructed with reflective sides, a light homogenizing top cover film and illuminated on one side by a red Luxeon III LED with a peak emission at 625 nm (e.g. as available from Philips Lumileds, San Jose Calif.). Luminance measurements were made with a Minolta LS-100 luminance meter. Reference luminance measurements were made with the homogenizing top cover film, and then with the processed construction, comprising the patterned film self-registered, via the processing, to the lenticular. In each case, the patterned reflector side was placed on top of the cover film (backlight side), so that the lenticular side was nearest the viewer/luminance meter.

When a Scotchcal 3635-30 diffusor film, available from 3M Company, St. Paul, Minn., was used as the light homogenizing top cover film, a typical luminance around 440 Candellas per square meter was measured in the center of the box, and about 300 Ca/sqm in the corner. The STOF/lenticular construction was then place on top of the cover film, lenticular side up. The larger processed piece fully covered the top of the recycling backlight cavity box. In the center of the box, on-axis luminance was then measured to be at least 780 or even 960 Ca/sqm, depending on the spot and particular piece. The off-axis luminance was less than the reference with top cover film only. At the corner of the box, a luminance of 640 was measured for a section of the larger 119 mm×119 processed piece while a luminance of 720 was measured for the 25 mm×25 mm piece.

When a piece of Asymmetric Reflecting Film (ARF), e.g. as described in Weber, et al. "Backlight and Display System Using Same," PCT International Publication Number WO 2008/144656 A2, was used as the light homogenizing top cover film, a typical luminance around 330 Candellas per square meter was measured in the center of the box. When the lenticular film, alone, was placed atop the ARF, the on-axis luminance gain was measured to be only about a factor of 1.3. With the large STOF/lenticular piece, on-axis luminance was observed around 1120 to 1135 Ca./sqm, nearly a factor of four increase in on-axis luminance gain.

In these manners, light-directing backlights were formed that provided improved on-axis luminance using the self-registered patterned reflector/lenticular combination construction, the construction having been processed using radiant energy through the patterned (lenticular) surface.

Various modifications and alterations of the present invention will become apparent to those skilled in the art without departing from the spirit and scope of the invention. Thus, embodiments of the LIGHT DIRECTING FILM are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. A light directing film comprising:
a back major surface comprising light reflection regions and light transmission regions and being planar;
a front major surface opposing the back surface, the front surface being planar; and
a plurality of lenses disposed between the front surface and the back surface,
wherein at least selected light transmission regions are registered with selected lens elements.

2. A light directing film according to claim 1, further comprising a graphic image adjacent to the front surface.

3. A light directing film according to claim 1, wherein the front major surface has an effective refractive index of less than 1.3.

4. A light directing film according to claim 1, wherein the front major surface has an effective refractive index of less than 1.2.

5. A light directing film according to claim 1, wherein the plurality of lenses comprises a linear lens array.

6. A light directing film according to claim 1, wherein the plurality of lenses comprises a linear lenticular lens array or Fresnel lens array.

7. A light directing film according to claim 1, wherein a layer of transparent material having an effective refractive index of less than 1.3 separates the plurality of lenses from the front surface.

8. A light directing film according to claim 1, wherein the light reflection regions reflect at least 90% of incident light.

9. A light directing film according to claim 1, wherein the light reflection regions separate the light transmission regions and are within a common plane.

10. A light directing film according to claim 5, wherein the linear lens array has a period of less than 500 micrometers.

11. A light directing film according to claim 1, wherein the light directing film has a thickness of less than 2 mm.

12. A light directing film according to claim 1, further comprising an adhesive layer disposed on the front surface or the back surface.

13. A light directing film according to claim 1, further comprising a hardcoat layer or a dirt shedding layer disposed on or adjacent to the front surface.

14. A light directing film according to claim 1, wherein the light reflection regions comprise nanoparticle thermal receptors.

15. A method comprising:
directing radiation toward a front surface of a light directing film to form light transmissive regions in a light reflecting layer of a light directing film, the light directing film comprising:
a planar back major surface comprising a light reflection layer;
a front major surface opposing the back surface, the front surface being planar; and
a plurality of lenses disposed between the front surface and the back surface,
wherein at least selected light transmission regions are registered with selected lens elements.

16. A method according to claim 15, wherein the radiation heats up selected regions of the light reflecting layer to increase the light transmissivness of the selected regions.

17. A method according to claim 15, wherein the radiation heats up nanoparticle thermal receptors in the selected regions of the light reflecting layer to increase the light transmissivness of the selected regions.

18. A method according to claim 15, wherein the radiation does not remove material from the selected regions.

19. A method according to claim 15, wherein the radiation is collimated.

20. A method according to claim 15, further comprising disposing a graphic image adjacent to the front surface.

21. A method according to claim 15, further comprising disposing an adhesive layer adjacent to the front surface or back surface.

22. A method according to claim 15, further comprising disposing a hardcoat layer or a dirt shedding layer adjacent to the front surface.

23. A method according to claim 15, wherein the front major surface has an effective refractive index of less than 1.3.

24. A method according to claim 15, wherein the plurality of lenses comprises a linear lenticular lens array or Fresnel lens array.

25. A method according to claim 15, wherein a layer of transparent material having an effective refractive index of less than 1.3 separates the plurality of lenses from the front surface.

26. An illuminated sign comprising:
an enclosure comprising a light reflection surface and a light emission surface;
a light source disposed within the enclosure;

a light directing film forming at least a portion of the light emission surface, the light directing film comprising:
- a planar back major surface comprising light reflection regions and light transmission regions and being planar;
- a front major surface opposing the back surface, the front surface being planar; and
- a plurality of lenses disposed between the front surface and the back surface, wherein at least selected light transmission regions are registered with selected lens elements.

27. An illuminated sign according to claim 26, further comprising a graphic image adjacent to the front surface.

28. An illuminated sign according to claim 26, wherein the front major surface has an effective refractive index of less than 1.3.

29. An illuminated sign according to claim 26, wherein the plurality of lenses comprises a linear lens array that is coextensive across a length of the light directing film.

30. An illuminated sign according to claim 29, wherein the linear lens array has a period of less than 500 micrometers.

31. An illuminated sign according to claim 26, wherein the plurality of lenses comprises a linear lenticular lens array or Fresnel lens array.

32. An illuminated sign according to claim 26, wherein a layer of transparent material having an effective refractive index of less than 1.3 separates the plurality of lenses from the front surface.

33. An illuminated sign according to claim 26, wherein the light reflection regions separate the light transmission regions and are within a common plane.

34. An illuminated sign according to claim 26, wherein the light directing film has a thickness of less than 2 mm.

35. An illuminated sign according to claim 26, further comprising an adhesive layer disposed on the front surface or the back surface.

36. An illuminated sign according to claim 26, further comprising a hardcoat layer or a dirt shedding layer disposed on or adjacent to the front surface.

37. An illuminated sign according to claim 26, wherein the light reflection regions comprise nanoparticle thermal receptors.

* * * * *